// United States Patent [15] 3,643,099
Yamashita [45] Feb. 15, 1972

[54] ELECTRO-OPTICAL NETWORK FOR SELECTIVELY PRODUCING A SINGLE PULSE OR PULSE TRAIN IN RESPONSE THERETO OF A SINGLE TRIGGER PULSE

[72] Inventor: Sadahiko Yamashita, Kadoma, Japan

[73] Assignee: Matsushita Electric Industrial Company Limited, Osaka, Japan

[22] Filed: Sept. 17, 1970

[21] Appl. No.: 73,052

[30] Foreign Application Priority Data

Sept. 20, 1969 Japan....................................44/75572

[52] U.S. Cl...........................................250/206, 250/217 S
[51] Int. Cl.........................................................H01j 39/12
[58] Field of Search................250/213 A, 211 R, 217 S, 206; 332/3; 331/66

[56] References Cited

UNITED STATES PATENTS 3,064,132 11/1962 Strull ................................250/206 X
3,365,647 1/1968 Stone ................................250/206 X
3,462,605 8/1969 Engeler..............................250/217 S

*Primary Examiner*—James W. Lawrence
*Assistant Examiner*—T. N. Grigsby
*Attorney*—John Lezdey

[57] ABSTRACT

An electro-optical network having electrically isolated units, one of said units containing an injection-electroluminescent pulse-generating diode and another of said units containing a pulse-generating diode in series with a photoconductive element positioned in radiation-coupled relationship with said first-mentioned diode. Both of the pulse-generating diodes are of the type in which they start oscillation at a certain predetermined bias voltage $V_1$ and cease to oscillate at another predetermined voltage $V_2$ lower than $V_1$. Under the bias conditions of $V_2<VbV_1$, when a single trigger pulse is applied to the injection-electroluminescent pulse-generating diode, it starts to oscillate, emitting light from the PN junction. The light thus emitted irradiates the photoconductive element, causing a reduction in the resistance thereof. Consequently, a voltage as applied across said pulse-generating diode increases, rendering it for oscillation. With a bias of $Vb<V_2$, the application of the single pulse produces only a single output pulse.

6 Claims, 6 Drawing Figures

INVENTOR.
SADAHIKO YAMASHITA
BY
John Lezdey
Attorney

INVENTOR.
SADAHIKO YAMASHITA
BY John Lezdey
attorney

ELECTRO-OPTICAL NETWORK FOR SELECTIVELY PRODUCING A SINGLE PULSE OR PULSE TRAIN IN RESPONSE THERETO OF A SINGLE TRIGGER PULSE

This invention relates to an electro-optical network having an injection-electroluminescent junction diode and a photoconductor as elements thereof. More particularly, the invention relates to such an electro-optical network having electrically separate units and finding applications in communications in an electronic computer.

The network described employs novel semiconductor pulse generators of the type disclosed in my copending U.S. Patent application entitled "SEMICONDUCTOR PULSE GENERATOR," Ser. No. 4,574, filed on Jan. 21, 1970.

It is an object of this invention to provide an electro-optical network having separate units, one of said units containing an injection-electroluminescent pulse-generating diode and another of said units containing a pulse generating diode and a photoconductor positioned in radiation-coupled relationship with said first-mentioned diode.

It is a further object of this invention to provide an electro-optical network capable of selectively producing a single pulse of a coherent pulse train in response to application thereto of a single trigger pulse.

Before describing more specifically the concept of this invention, it will be helpful to discuss the principle upon which the above-mentioned pulse generator operates.

Figure 1:
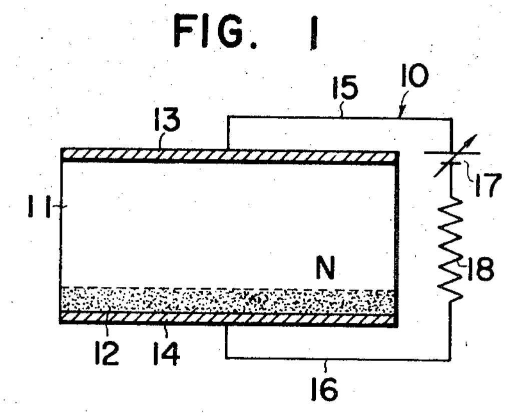
FIG. 1 is a schematic sectional view of a pulse-generating diode employed in the present electro-optical network.

Referring to FIG. 1, the pulse generator 10 as applicable in this invention has a diode configuration and comprises a wafer 11 of a semiconductor material such as one having two valleys in its conduction band. The material of the wafer 11 may comprise gallium arsenide, indium phosphide, indium arsenide or cadmium telluride. The wafer 11 is, for example, N-type and has a highly resistive layer 12 formed adjacent one of the two major surfaces thereof. Diffusion or crystal growth may be utilized to dope an impurity, locally lowering the conductivity of the wafer 11 to thereby form the highly resistive layer 12 of $\nu$ type.

The diode has thus a $\nu$-N structure, and a similar characteristic is also available in the case of a symmetrical structure of $\nu$-N-$\nu$ type. The impurity may comprise, for example, iron, nickel, copper, chromium, cobalt or manganese.

Deposited upon and in ohmic contact with both of the major surfaces of the wafer 11 are conducting electrodes 13 and 14 which may comprise tin alloy, eutectic mixture of gold and germanium and the like. Connections to these electrodes 13 and 14 are made by lead wires 15 and 16, respectively, which are connected across a power source 17 of variable DC voltage in series with a load resistance 18.

Figure 2:
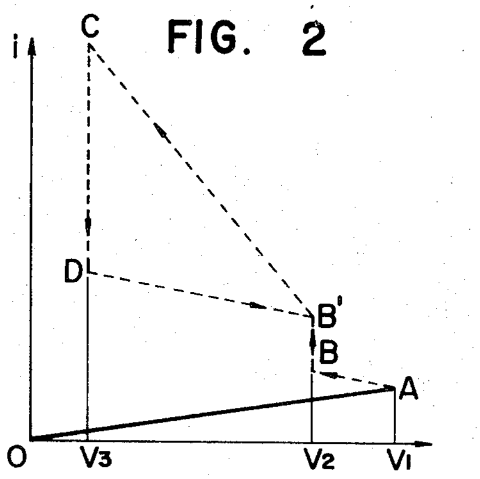
FIGS. 2 and 3 are graphs explaining the principle of the oscillation achievable with the pulse-generating diode of FIG. 1.

Turning now to FIG. 2, as a voltage V as applied across the wafer 11 is increased, the current $i$ flowing therethrough slightly increases. When the voltage V exceeds the threshold value $V_1$, avalanche multiplication of carriers takes place in the highly resistive layer, causing the operating point to move from A to C through B and B'. The point C may be assumed to correspond to the conditions under which the highly resistive layer 12 is short circuited. The operating point, then, moves to point D and back to point B'. It should be noted that this cycle repeats itself along the locus B'CD if the bias voltage V is above $V_2$. Therefore, the value $V_1$ may be called on oscillation starting voltage, while the value $V_2$ an oscillation terminating voltage.

As will be understood from the locus B'CD, this diode may switch between a high and low current situation due to the effect of the avalanche multiplication and to the trapping effect in deep impurity centers.

Figure 3:
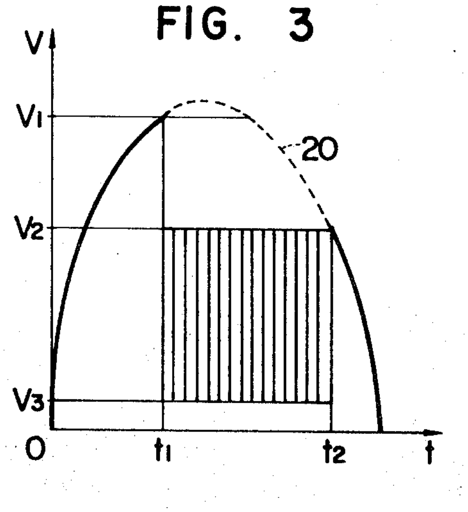

FIG. 3 is a plot of voltage Va appearing across the diode 10 against time $t$, when the magnitude of the bias voltage Vb is sinusoidally changed during a half cycle. As shown, the voltage Va increases with increasing bias voltage Vb. At the time $t_1$ when Vb reaches $V_1$, the diode 10 starts to oscillate, so that the voltage Va cyclically varies between $V_2$ and $V_3$, as described in connection with FIG. 2.

However, as is shown by the dotted line 20 of FIG. 3, even if the bias voltage Vb is decreased below $V_1$, the diode 10 does not cease to oscillate. For the diode 10 to cease oscillation, it is necessary to lower the bias voltage Vb below $V_2$. It is to be understood, in this connection, that a hysteresis phenomenon can be observed in this pulse generating diode 10.

The diode may be characterized as follows. (1) The upper limit of the repetition rate is determined by the property of the diode itself, and the lower limit is reduced by increasing the RC time constant of the external circuit. (2) The pulse-repetition rate has been varied by a DC bias current of the order of 10. (3) A large output voltage of up to 50 volts (for a 50-ohm resistive load) is obtained with a pulse width of a nanosecond.

Figure 4:
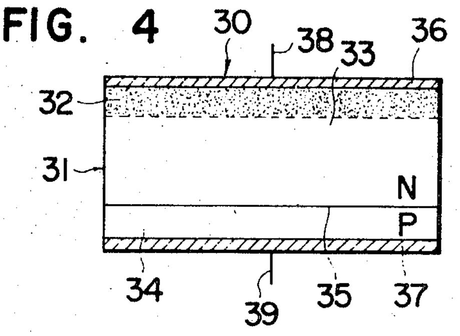
FIG. 4 is a schematic diagram of an injection-electroluminescent pulse-generating diode employed in the present electro-optical network.

FIG. 4 shows diagrammatically an injection-electroluminescent pulse-generating diode 30 of the electro-optical network according to this invention. The diode 30 comprises an N-type GaAs wafer 31 having a highly resistive layer 32 formed adjacent one major surface thereof. An impurity such as iron is diffused into the wafer 31 to locally lower the conductivity to thereby form the highly resistive layer 32 of $\nu$ type. It is to be understood that a combination of the N-type region 33 and the highly resistive layer 32 comprises the semiconductor pulse generator described in connection with FIGS. 1, 2 and 3.

Adjacent the opposite major surface of the wafer 31 there is formed a P-type region 34 containing P-type determining impurity such as zinc. Thus, the wafer 31 has formed between the N- and P-type regions 31 and 34 a PN junction 35 at which injection electroluminescence takes place when biased in the forward direction. Conducting electrodes 36 and 37 are deposited upon and in ohmic contact with each of the two major surfaces, respectively, of the wafer 31. The conducting electrodes 36 and 37 are connected to a bias voltage source (not shown) by means of lead wires 38 and 39, respectively.

Figure 5:
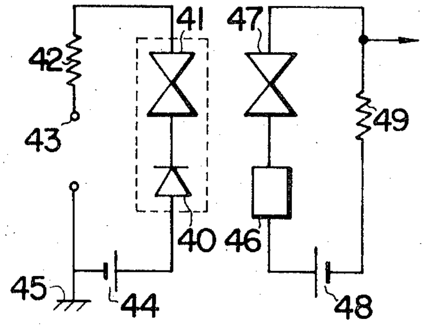
FIG. 5 is a circuit diagram of the present electro-optical network.

FIG. 5 is a circuit diagram showing the present electro-optical network. In the diagram, the injection-electroluminescent pulse-generating diode 30, is shown equivalently as enclosed within a dash rectangle and, comprising an injection-electroluminescent diode 40 and a pulse generator 41. The pulse generator 41 is connected through a resistor 42 to an input terminal 43, while the injection-electroluminescent diode 40 is connected to a source 44 of DC bias voltage $Vb_1$ which in turn is grounded as at 45.

A photoconductive cell or a photodiode 46 is positioned in radiation-coupled relationship with the injection-electroluminescent diode 40 and is connected in series with a semiconductor pulse generator 47 of the type shown in FIG. 1. Connected across the photoconductive cell 46 and the pulse generator 47 is another source 48 of DC bias voltage $Vb_2$ in series with a load impedance 49. It is to be understood that the series combination of the pulse generator 47 and the photoconductive element 46 can be formed integral with one another by depositing a layer of a photoconductive material on the major surface of the wafer 11 shown in FIG. 1 opposite to the highly resistive layer 12. In this case, the conducting electrode 13 should be permeable to the radiation emitted from the PN junction 35 of the diode 30.

Figure 6:
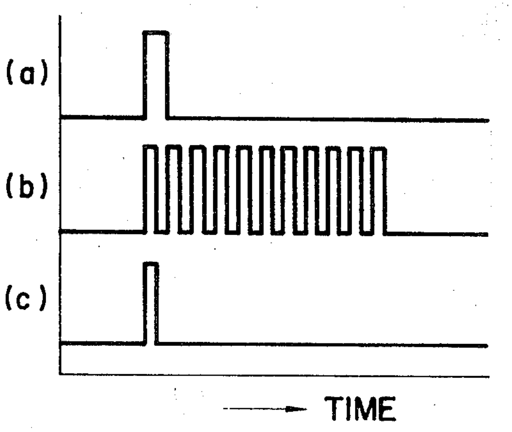
FIG. 6 is a view explaining the operation of the present electro-optical network.

In the operation of the network shown in FIG. 5, the DC voltage source 44 is adjusted so that $V_2<Vb_1<V_1$, while the DC voltage source 48 is adjusted so that $Vb_2<V_1$. When a single pulse having a sufficiently large amplitude, as shown in FIG. 6($a$), is applied at the input terminal 43, a voltage as applied across the pulse generator portion 41 of the diode 30 exceeds its threshold value $V_1$, causing the diode 30 to start oscillating. Since the bias voltage is above $V_2$, the diode 30 continues to oscillate until a negative pulse is applied thereto. During the time when the diode 30 is oscillating, current flows through the PN junction 35, causing excess minority carriers to be injected into the semiconductor wafer 31. Upon recombination of the minority carriers with majority carriers, light is emitted at the junction 35.

Because of the radiation-coupled relationship between the injection-electroluminescent diode 40 and the photoconductive cell 46 the light emitted from the junction 35 strikes the sensitive surface of the photoconductive cell 46, causing a reduction in the resistance thereof. This will increase the voltage as applied across the pulse-generating diode 47 and consequently it starts oscillating at the time when the voltage exceeds $V_1$. The output in the form of coherent pulse train obtained through the load impedance 49 is shown in FIG. 6(*b*).

On the other hand, with a bias voltage of $Vb_1<V_2$, only a single output pulse is obtained, as shown in FIG. 6(*c*), in response to application of a single pulse to the input terminal 43. This is because the pulse-generating diode 41 cannot continue to oscillate under the bias conditions of $Vb_1<V_2$.

Therefore, it is to be noted that the electro-optical network according to this invention is capable of selectively generating a single pulse or a coherent pulse train in response to application thereto of a single pulse as an input.

Furthermore, it should be appreciated that a plurality of such electro-optical networks can be formed on a single-crystal substrate in matrix form to provide a radiation-coupled logic circuit.

What is claimed is:

1. An electro-optical network for selectively producing a single pulse or a pulse train in response to application thereto of a single trigger pulse, comprising an injection-electroluminescent pulse-generating diode in radiation-coupled relationship with a photoconductive element, a pulse-generating diode connected in series with said photoconductive element, a first electric circuit for applying a bias voltage to said injection-electroluminescent pulse-generating diode, an input means connected to said first electric circuit, a second electric circuit comprising a source of bias voltage connected to said series combination of the photoconductive element and the pulse-generating diode, and an output means connected to said second electric circuit, said first and second electric circuits being electrically isolated from but optically coupled with one another for transfer of energy from said first circuit of the injection-electroluminescent pulse-generating diode to said second circuit of the photoconductive element.

2. An electro-optical network according to claim 1, in which said injection-electroluminescent pulse-generating diode comprises a semiconductor wafer of one conductivity type, a highly resistive region formed near one major surface of said wafer, a region of the opposite conductivity type formed near the opposite major surface of said wafer with a PN junction provided between said two regions, a pair of conducting electrodes each being held in ohmic contact with one of the major surfaces of said wafer.

3. An electro-optical network according to claim 1, in which said photoconductive element is a photoconductive cell or a photodiode having its conductivity increased in response to radiant energy excitation.

4. An electro-optical network according to claim 3, in which said pulse-generating diode and said photoconductive element are formed integral with one another.

5. An electro-optical network according to claim 1, in which said network produces a pulse train in response to application thereto of a single trigger pulse when said injection-electroluminscent pulse-generating diode is biased at a voltage between the oscillation starting and terminating voltages of said diode and said last-named pulse-generating diode is biased at a voltage below the oscillation starting voltage.

6. An electro-optical network according to claim 1, in which said network produces a single output pulse in response to application thereto of a single trigger pulse when said injection-electroluminescent pulse-generating diode is biased at a voltage below the oscillation terminating voltage and said last-named pulse-generating diode is biased at a voltage below the oscillation starting voltage.

* * * * *